(12) United States Patent
Tonelli et al.

(10) Patent No.: US 10,723,839 B2
(45) Date of Patent: Jul. 28, 2020

(54) PROCESS FOR THE SYNTHESIS OF (PER)FLUOROPOLYETHER AMINES

(71) Applicant: SOLVAY SPECIALTY POLYMERS ITALY S.P.A., Bollate (IT)

(72) Inventors: Claudio Adolfo Pietro Tonelli, Paderno d'adda (IT); Ivan Diego Wlassics, Garessio (IT); Giuseppe Marchionni, Milan (IT)

(73) Assignee: SOLVAY SPECIALTY POLYMERS ITALY S.P.A., Bollate (MI) (IT)

(*) Notice: Subject to any disclaimer, the term of this patent is extended or adjusted under 35 U.S.C. 154(b) by 10 days.

(21) Appl. No.: 15/743,129

(22) PCT Filed: Jul. 7, 2016

(86) PCT No.: PCT/EP2016/066073
§ 371 (c)(1),
(2) Date: Jan. 9, 2018

(87) PCT Pub. No.: WO2017/005832
PCT Pub. Date: Jan. 12, 2017

(65) Prior Publication Data
US 2019/0100619 A1    Apr. 4, 2019

(30) Foreign Application Priority Data
Jul. 9, 2015   (EP) .................................. 15175980

(51) Int. Cl.
| | | |
|---|---|---|
| *C08G 65/333* | (2006.01) | |
| *C08G 65/00* | (2006.01) | |
| *C08G 65/325* | (2006.01) | |
| *C08G 65/334* | (2006.01) | |

(52) U.S. Cl.
CPC ..... *C08G 65/33306* (2013.01); *C08G 65/007* (2013.01); *C08G 65/3255* (2013.01); *C08G 65/3346* (2013.01); *C08G 2650/48* (2013.01); *C08G 2650/50* (2013.01)

(58) Field of Classification Search
None
See application file for complete search history.

(56) References Cited

U.S. PATENT DOCUMENTS

| | | | |
|---|---|---|---|
| 3,810,874 A | | 5/1974 | Mitsch et al. |
| 4,085,137 A | * | 4/1978 | Mitsch ................. C07C 265/00 428/422 |
| 4,094,911 A | * | 6/1978 | Mitsch .................... C06B 45/10 528/229 |
| 5,446,205 A | | 8/1995 | Marchionni et al. |
| 6,083,600 A | * | 7/2000 | Kasai ................... C10M 105/60 428/421 |
| 6,984,759 B2 | | 1/2006 | Di Meo et al. |
| 7,803,284 B2 | * | 9/2010 | Petricci ..................... C09K 5/10 165/104.19 |
| 2003/0149307 A1 | * | 8/2003 | Hai ..................... C08G 65/3255 564/469 |
| 2006/0052262 A1 | * | 3/2006 | Akada .................. C08G 65/007 508/556 |
| 2009/0187037 A1 | * | 7/2009 | Holmes .................... C07C 41/22 558/11 |
| 2009/0216104 A1 | * | 8/2009 | DeSimone .............. A61L 27/34 600/365 |
| 2019/0106538 A1 | * | 4/2019 | Valsecchi ............. C08G 65/007 |

FOREIGN PATENT DOCUMENTS

| | | | | |
|---|---|---|---|---|
| CA | 2435924 A1 | * | 2/2004 | ........... C08G 65/007 |
| EP | 621298 A2 | | 10/1994 | |
| EP | 665253 A1 | | 8/1995 | |
| EP | 1388556 A2 | | 2/2004 | |
| EP | 1614703 A1 | | 1/2006 | |
| EP | 1810987 B1 | | 10/2008 | |
| JP | 06219994 A | | 8/1994 | |
| WO | 2014090649 A1 | | 6/2014 | |

OTHER PUBLICATIONS

Tonelli Claudio et al., "Linear Perfluoropolyether difunctional oligomers: chemistry, properties and applications", Journal of Fluorine Chemistry, 1999, vol. 95, No. 1-2, p. 51-70.

Strepparola Ezio et al., "Elastomeric polyimides from alpha,omega-Bis(aminomethyl)polyoxyperfluoroalkylenes and Tetracarboxylic Acids", Ing. Eng. Chem. Product Research & Development, 1984, vol. 23, No. 4, p. 600-605.

* cited by examiner

*Primary Examiner* — Nicole M. Buie-Hatcher

(57) ABSTRACT

A process for the manufacture of a (per)fluoropolyether amine comprising reacting a sulfonic ester of a (per)fluoropolyether alcohol with an excess of ammonia or organic amine at selected temperature is herein disclosed. The process allows obtaining (per)fluoropolyether amines, in particular primary, secondary and tertiary (per)fluoropolyether amines with high yields and selectivity and can be conveniently applied on an industrial scale.

16 Claims, No Drawings

PROCESS FOR THE SYNTHESIS OF (PER)FLUOROPOLYETHER AMINES

CROSS-REFERENCE TO PREVIOUS APPLICATION

This application is a U.S. national stage entry under 35 U.S.C. § 371 of International Application No. PCT/EP2016/066073 filed Jul. 7, 2016, which claims priority to European patent application No. 15175980.0 filed on Jul. 9, 2015. The entire contents of these applications are explicitly incorporated herein by this reference.

TECHNICAL FIELD

The present invention relates to a process for the synthesis of functional (per)fluoropolyethers, in particular for the synthesis of (per)fluoropolyethers comprising amine groups.

BACKGROUND ART (Per)fluoropolyethers (PFPEs) are fluorinated polymers comprising a fully or partially fluorinated polyoxyalkylene chain that contains recurring units having at least one catenary ether bond and at least one fluorocarbon moiety. The most widespreadly known PFPEs can be obtained by means of processes comprising either the homopolymerization of hexafluoropropylene oxide (HFPO) or 2,2,3,3-tetrafluorooxetane or the photooxidation of tetrafluoroethylene (TFE) and/or hexafluoropropylene (HFP).

PFPEs can be divided into non-functional and functional; the former comprise a PFPE chain having at least two ends, wherein such ends bear (per)haloalkyl groups, while the latter comprise a PFPE chain having at least two ends, wherein at least one end comprises a functional group. The most widespreadly known functional PFPEs are mono- and bi-functional PFPEs, i.e they have one or two functional end groups. Functional PFPEs can be used as starting materials for the manufacture of other functional PFPEs that are used as such for a variety of industrial applications, e.g. as additives for lubricant compositions. In addition, functional PFPEs can be used as building blocks for the manufacture of block copolymers.

Certain functional PFPEs wherein at least one chain end bears at least one amine group (herein after otherwise referred to as "PFPE amines") and methods for their manufacture are known in the art. However, the available manufacturing methods suffer from certain drawbacks.

U.S. Pat. No. 3,810,874 B (MINNESOTA MINING & MFG) 14 May 1974 discloses, in Example XIV, the synthesis of a PFPE diamine of formula:

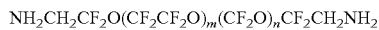

NH$_2$CH$_2$CF$_2$O(CF$_2$CF$_2$O)$_m$(CF$_2$O)$_n$CF$_2$CH$_2$NH$_2$ by reaction of a PFPE disulfonate of formula:

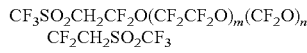

CF$_3$SO$_2$CH$_2$CF$_2$O(CF$_2$CF$_2$O)$_m$(CF$_2$O)$_n$
CF$_2$CH$_2$SO$_2$CF$_3$ with liquid anhydrous ammonia in a 16:1 molar ratio with respect to the sulfonyl groups of the PFPE. The reaction is carried out under pressure at 100° C. in the absence of solvents. The reported yield is 93%.

However, when the Applicant followed the procedure disclosed in that example, the desired PFPE amine was obtained with a yield lower than 70% and with low selectivity, due to the formation of several by-products. Furthermore, this document does not disclose or give hints to the manufacture of secondary and tertiary PFPE amines, which are also difficult to obtain with high selectivity and yields.

This conclusion was also previously arrived at and reported in TONELLI, Claudio, et al. Linear Perfluoropolyether difunctional oligomers: chemistry, properties and applications. *Journal of Fluorine Chemistry.* 1999, vol. 95, no. 1-2, p. 51-70. On page 60, par. 2.2.2.4, right hand column, last paragraph, it taught that primary and secondary PFPE amines can be obtained by reaction of a PFPE nonaflate with ammonia or primary amines; however, it is explained that such method is not convenient, unless a large excess of amine or hindered primary amines are used; indeed, since PFPE amines are stronger bases than ammonia, they compete with ammonia or with the primary amine in the reaction with the PFPE nonaflate, thereby leading to the formation on by-products. Furthermore, no teaching or hint is given with regard to any possible effect of temperature on the reaction selectivity.

Examples 1-3 of U.S. Pat. No. 6,984,759 B (SOLVAY SOLEXIS SPA) Oct. 1, 2006 also teach the preparation of a PFPE diamine of formula:

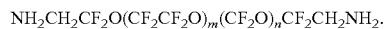

NH$_2$CH$_2$CF$_2$O(CF$_2$CF$_2$O)$_m$(CF$_2$O)$_n$CF$_2$CH$_2$NH$_2$.

In this case, the reaction proceeds by catalytic reduction of a PFPE dinitrile of formula:

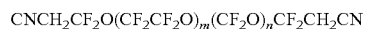

CNCH$_2$CF$_2$O(CF$_2$CF$_2$O)$_m$(CF$_2$O)$_n$CF$_2$CH$_2$CN in the presence of a Pd/Ca F$_2$ catalyst.

This method is, however, quite expensive to be carried out on an industrial scale, in view of the fact that:
- the dinitrile must be synthesised by conversion of a PFPE-diester into the corresponding diamide and then by conversion of the diamide into nitrile;
- the amount of catalyst is as high as 50% wt with respect to the PFPE-dinitrile.

Furthermore, the reaction requires the use of a Pd/CaF$_2$ catalyst, having a lower surface area than catalysts based on other metals supported on carbon.

U.S. Pat. No. 5,446,205 B (AUSIMONT SRL) 29 Oct. 1995 discloses, in Example 7, the synthesis of a PFPE amine of formula:

Cl$_3$F$_6$O(C$_3$F$_6$)$_{1.27}$(CF$_2$O)$_{0.05}$CF$_2$CH$_2$NH$_2$ by reduction of a PFPE amide of formula:

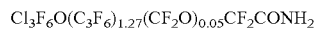

Cl$_3$F$_6$O(C$_3$F$_6$)$_{1.27}$(CF$_2$O)$_{0.05}$CF$_2$CONH$_2$ with LiAlH$_4$ in ethyl ether as solvent.

Even if this method allows the obtainment of primary, secondary and tertiary amines, it requires the use of a flammable and anhydrous solvent and of LiAlH$_4$ as reducing agent, which is expensive and sensitive to moisture. Furthermore, the workup of the final reaction mixture and the isolation of the PFPE amine is troublesome, in view of the fact that unreacted LiAlH$_4$ is still present and needs to be destroyed.

A method similar to that disclosed in U.S. Pat. No. 5,446,205 is reported in STREPPAROLA, Ezio, et al. Elastomeric polyimides from alpha,omega-Bis(aminomethyl) polyoxyperfluoroalkylenes and Tetracarboxylic Acids. *I&C Product Research & Development.* 1984, vol. 23, no. 4, p. 600-605.

JP H06219994 (IDEMITSU PETROCHEM CO LTD) Sep. 8, 1994 discloses the synthesis of perfluoroalkylamines of formula R$_f$CH$_2$NH$_2$, wherein R$_f$ is perfluoroalkyl, by reaction of a perfluoroalkylsulfonyl ester with an excess of ammonia under pressure at a temperature ranging from 50° C. to 200° C., usually in the presence of a solvent. The examples specifically teach the synthesis of three perfluoroalkylsulfonyl amines in the presence of DMF as solvent at 100° C. In the examples, ammonia is used in a molar excess of about 2.5 with respect to the perfluoroalkylsulfonyl ester. This patent document does not disclose or provide suggestions to the synthesis of PFPE amines.

EP 0621298 A (AUSIMONT SPA) 26 Oct. 1994 discloses fluorinated polymers having thermoplastic properties comprising in the macromolecule perfluoropolyoxyalkylene sequences of formula: —$CF_2O(CF_2CF_2O)_m$—$(CF_2O)_n$—$CF_2$—, wherein m/n=0.2+5.

Such polymers can be obtained by polycondensation of one or more condensation monomers of formula:

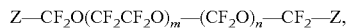

wherein Z is a reactive group and m and n are as defined above.

Among such condensation monomers, a tosyl sulfonate ester derivative of a PFPE containing ethylene oxide segments is mentioned at entry 5 of Table 1 on page 5. Entry 4 of the same table refers to a monomer wherein —Z is a —$CH_2NH_2$ group; despite the fact that entry 4 discloses the synthesis of this derivative by reaction of a monomer wherein —Z is —$CH_2OSO_2CF_3$ with ammonia, no details on such reaction are provided, nor is the synthesis of PFPE amines from monomers of entry 5 therein disclosed.

EP 0665253 A (AUSIMONT S.P.A.) Feb. 8, 1995 discloses the use of bi- or poly-functional PFPE polymers for the preparation of high-dry formulations for paints and coatings. Examples 1 teaches the manufacture of a PFPE tetraol through a synthetic pathway which starts from the reaction of a PFPE diol with tosylchloride to provide the corresponding sulfonic ester. The resulting disulfonic ester is reacted with ethyl malonate to provide a tetraester which is subsequently reduced to provide the tetraol. This document does disclose the reaction of PFPE sulfonic esters with amines.

EP 1388556 A (SOLVAY SOLEXIS SPA) Feb. 11, 2004 discloses a process for the manufacture of PFPE derivatives, including amine derivatives, by catalytic reduction.

There is therefore the need to provide a convenient method for the manufacture of PFPE amines, in particular primary, secondary and tertiary PFPE amines, that provides high yields and selectivity, avoids the use of expensive and/or excessively dangerous chemicals and that can be conveniently carried out on an industrial scale.

SUMMARY OF INVENTION

The Applicant has now surprisingly found out that PFPE amines, in particular primary, secondary and tertiary PFPE amines, can be conveniently obtained by reacting a sulfonic ester of a PFPE alcohol (herein after also referred to as "PFPE sulfonic ester" or "PFPE sulfonate") with an excess of ammonia or organic amine at a temperature ranging from 20° C. to 50° C.

Indeed, the Applicant has found out that by using an excess of ammonia or organic amine and by carefully keeping the temperature within the aforementioned range, PFPE amines can be obtained with high yields and selectivity.

Accordingly, the present invention relates to a process [herein after otherwise referred to as "process (P)"] for the manufacture a PFPE amine, said process comprising reacting a sulfonic ester of a PFPE alcohol with an excess of ammonia or organic amine at a temperature ranging from 20° C. to 50° C.

General Definitions, Symbols and Abbreviations

For the avoidance of doubt, throughout the present application, the acronym "PFPE" stands for "(per)fluoropolyether", i.e. fully or partially fluorinated polyether. When this acronym is used as substantive in the plural form, it is referred to as "PFPEs".

The term "(per)haloalkyl" denotes a fully or partially halogenated straight or branched alkyl group.

Unless otherwise indicated, the term "halogen" includes fluorine, chlorine, bromine and iodine.

The use of parentheses "( . . . )" before and after names, symbols or numbers identifying formulae or parts of formulae like, for example "formula (I)", "chain ($R_f$)", etc . . . , has the mere purpose of better distinguishing those names, symbols or numbers from the rest of the text; thus, said parentheses could also be omitted.

The adjective "aromatic" or "aryl" denotes any cyclic moiety having a number of π electrons equal to 4n+2, wherein n is 0 or any positive integer.

The expression "average functionality (F)" denotes the average number of functional groups per polymer molecule and can be calculated according to methods known in the art. For example, the average functionality (F) of PFPE alcohols can be calculated following the method reported in EP 1810987 B (SOLVAY SOLEXIS SPA) 25 Jul. 2007.

The terms "process" and "methods" are synonyms.

When ranges are indicated, range ends are included.

The expression "as defined above" is intended to comprise all generic and specific or preferred definitions referred to by that expression in preceding parts of the description, unless indicated otherwise.

Detailed Description of Process (P)

In process (P) according to the invention, the PFPE sulfonic ester to be reacted with ammonia or with an organic amine is a polymer comprising a fully or partially fluorinated polyether chain ($R_f$) having at least two chain ends, preferably two chain ends, wherein at least one chain end bears a sulfonic ester group. The sulfonic ester group is preferably selected from:

a (halo)alkyl sulfonyl group, preferably a fluoroalkyl sulfonyl group;

an aryl sulfonyl group, preferably a phenyl sulfonyl group, wherein the aryl moiety optionally bears one or more substituents independently selected from (fluoro)alkyl, cyano and nitro groups; preferably, the one or more substituent is an alkyl group.

Preferred sulfonyl groups are trifluoromethanesulfonate (triflate), nonafluorobutanesulfonate (nonaflate) and p-toluenesulfonate (tosylate), nonaflate and tosylate being more preferred.

According to a preferred embodiment of the invention, the PFPE sulfonic ester is typically a polymer comprising a fully or partially fluorinated polyether chain ($R_f$) having two chain ends, wherein at least one chain end bears a sulfonic ester group as defined above.

Typically, the PFPE sulfonic ester complies with formula (I) here below:

wherein:

A is a group of formula —CFX—$CH_2$—O—(CHY-CHYO)$_n$—$SO_2$—R wherein: X is F or $CF_3$; R is (halo)alkyl, preferably fluoroalkyl, or an aryl group, preferably phenyl, wherein the aryl moiety optionally bears one or more substituents independently selected from (fluoro)alkyl, cyano and nitro, preferably one or more alkyl substituents; Y is, independently of each other, hydrogen or lower alkyl, typically $C_1$-$C_4$ alkyl, preferably methyl; n is 0 or a positive number;

$R_f$ is a PFPE chain as defined above;

B is the same as A or is a (per)haloalkyl group, typically a $C_1$-$C_3$ haloalkyl group, preferably selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$.

According to a preferred embodiment, group A complies with formula (A-1):

—$CF_2$—$CH_2$—$O$—$(CH_2CH_2O)_n$—$SO_2$—R (A-1)

in which n and R are as defined above; according to a first preferred embodiment, n is 0; according to a second preferred embodiment, n is a positive number ranging from 1 to 10.

Typically, chain ($R_f$) comprises recurring units ($R°$) selected from:
(i) —CFXO—, wherein X is F or $CF_3$;
(ii) —CFXOFXO—, wherein X, equal or different at each occurrence, is F or $CF_3$, with the proviso that at least one of X is F;
(iii) —$CF_2CF_2CW_2O$—, wherein each of W, equal or different from each other, is F, Cl, H,
(iv) —$CF_2CF_2CF_2CF_2O$—;
(v) —$(CF_2)_j$—CFZ—O— wherein j is an integer from 0 to 3 and Z is a group of general formula —$OR_f*T$, wherein $R_f*$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

Preferably, chain ($R_f$) complies with formula ($R_f$-I):

—$(CFX^1O)_{g1}(CFX^2CFX^3O)_{g2}(CF_2CF_2CF_2O)_{g3}$
$(CF_2CF_2CF_2CF_2O)_{g4}$— ($R_f$-I)

wherein:
$X^1$ is independently selected from —F and —$CF_3$;
$X^2$, $X^3$, equal or different from each other and at each occurrence, are independently —F, —$CF_3$, with the proviso that at least one of X is —F;
g1, g2, g3, and g4, equal or different from each other, are independently integers≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formulae ($R_f$-IIA)-($R_f$-IIE):

—$(CF_2CF_2O)_{a1}(CF_2O)_{a2}$— ($R_f$-IIA)

wherein:
a1 and a2 are independently integers≥0 such that the number average molecular weight is between 400 and 10,000, preferably between 400 and 5,000; both a1 and a2 are preferably different from zero, with the ratio a1/a2 being preferably comprised between 0.1 and 10;

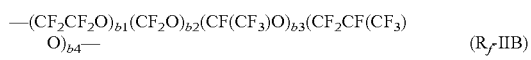

—$(CF_2CF_2O)_{b1}(CF_2O)_{b2}(CF(CF_3)O)_{b3}(CF_2CF(CF_3)$
$O)_{b4}$— ($R_f$-IIB)

wherein:
b1, b2, b3, b4, are independently integers≥0 such that the number average molecular weight is between 400 and 10,000, preferably between 400 and 5,000; preferably b1 is 0, b2, b3, b4 are >0, with the ratio b4/(b2+b3) being ≥1;

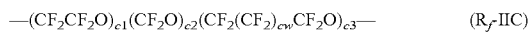

—$(CF_2CF_2O)_{c1}(CF_2O)_{c2}(CF_2(CF_2)_{cw}CF_2O)_{c3}$— ($R_f$-IIC)

wherein:
cw=1 or 2;
c1, c2, and c3 are independently integers≥0 such that the number average molecular weight is between 400 and 10,000, preferably between 400 and 5,000; preferably c1, c2 and c3 are all >0, with the ratio c3/(c1+c2) being generally lower than 0.2;

—$(CF_2CF(CF_3)O)_d$— ($R_f$-IID)

wherein:
d is an integer>0 such that the number average molecular weight is between 400 and 10,000, preferably between 400 and 5,000;

—$(CF_2CF_2C(Hal)_2O)_{e1}$—$(CF_2CF_2CH_2O)_{e2}$—
$(CF_2CF_2CH(Hal)O)_{e3}$— ($R_f$-IIE)

wherein:
Hal, equal or different at each occurrence, is a halogen selected from fluorine and chlorine atoms, preferably a fluorine atom;
e1, e2, and e3, equal to or different from each other, are independently integers≥0 such that the (e1+e2+e3) sum is comprised between 2 and 300.

Still more preferably, chain ($R_f$) complies with formula ($R_f$-III) here below:

—$(CF_2CF_2O)_{a1}(CF_2O)_{a2}$— ($R_f$-III)

wherein:
a1, and a2 are integers>0 such that the number average molecular weight is between 400 and 4,000, with the ratio a2/a1 being generally comprised between 0.2 and 5.

PFPE sulfonic esters can be obtained by sulfonation of a PFPE alcohol according to methods known in the art, for example following the teaching of TONELLI, Claudio, et al. Linear perfluoropolyether difunctional oligomers: chemistry, properties and applications. *Journal of Fluorine Chemistry*. 1999, vol. 95, p. 51-70., in particular as reported on page 64, par. 3.2.15.

The expression "PFPE alcohol" denotes a polymer comprising a fully or partially fluorinated polyether chain ($R_f$) having at least two chain ends, preferably two chain ends, wherein at least one chain end bears at least one hydroxy group.

In particular, PFPE sulfonic esters of formula (I) as defined above can be obtained by sulfonation of PFPE alcohols complying with formula (II):

D-O—$R_f$-E (II)

wherein:
D is a group of formula —CFX—$CH_2$—O—(CHY-CHYO)$_n$H wherein X is F or $CF_3$; Y is, independently of each other, hydrogen or lower alkyl, typically $C_1$-$C_4$ alkyl, preferably methyl; n is 0 or a positive number;
$R_f$ is a PFPE chain as defined above;
E is the same as D or is a (per)haloalkyl group, typically a $C_1$-$C_3$ haloalkyl group, preferably selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$.

Preferred PFPE sulfonic esters (I) wherein group A complies with formula (A-1) as defined above in which X is F and both Y are hydrogen can be obtained by sulfonation reaction of PFPE alcohols (II) wherein D complies with formula (D-1):

—$CF_2$—$CH_2$—O—$(CH_2CH_2O)_n$—H (D-1)

in which n is as defined above
and E is the same as (D-1) or is a (per)haloalkyl group as defined above.

PFPE alcohols can be obtained according to known methods. In particular, PFPE alcohols complying with formula (II) wherein n in group (D) is 0 can be obtained, for example, following the teaching of EP 1810987 B (SOLVAY SOLEXIS SPA) Jan. 10, 2008 and of EP 1614703 A (SOLVAY SOLEXIS SPA) Nov. 1, 2006.

PFPE alcohols wherein chain ($R_f$) complies with formula ($R_f$-III) as defined above and average functionality (F) is at least 1.8 are commercially available from Solvay Specialty Polymers Italy S.p.A. under the tradename Fomblin®.

PFPE alcohols complying with formula (II) wherein n in group (D) is a positive number equal to or higher than 1 and group (E) is the same as (D) or is a (per)haloalkyl group can be obtained from a PFPE alcohol (II) wherein n in group (D) is 0 and group (E) is the same as (D) or is a (per)haloalkyl group by reaction with an alkylene oxide in the presence of a base. In particular, PFPE alcohols wherein in group (D-1) n ranges from 1 to 10 and group (E) is the same as (D-1) or is a (per)haloalkyl group can be conveniently manufactured with the method disclosed in WO 2014/090649 (SOLVAY SPECIALTY POLYMERS ITALY) Jun. 19, 2014.

In process (P) according to the present invention, the organic amine that is reacted with the PFPE sulfonic ester is an organic amine compound comprising at least a primary or secondary amine group. According to a first aspect, the amine is a monoamine comprising a primary or secondary amine group. According to a second aspect, the organic amine is a polyamine comprising more primary or secondary amine groups or a combination thereof. The monoamine or polyamine may be aliphatic or aromatic.

For the sake of clarity, the expression "aliphatic amine" includes mono and polyamines wherein all primary and/or secondary amine groups are directly bound to an $sp^3$ carbon of an alkyl or alkylene chain. The alkyl and/or alkylene chain can be straight or branched and can comprise from 1 to 20 carbon atoms. Said alkyl and/or alkylene chain may comprise aromatic mono- or polycyclic hydrocarbon moieties or heteroatoms other than nitrogen, preferably selected from one or more of oxygen and/or sulfur, or functional groups other than amine groups, preferably selected from one or more of —OH, —C(O)—, —NH(CO)—, —(CO)O—, —O(CO)O—, —O(CO)NH—, —NH(CO)NH— and —C(S)—, or a combination thereof, said aromatic moieties, heteroatoms or functional groups interrupting or substituting the alkyl or alkylene chain.

The expression "aromatic amine" includes mono- and polyamines wherein at least one primary and/or secondary amine group is directly bound to an $sp^2$ carbon of an aromatic mono- or polycyclic hydrocarbon moiety.

Unless indicated otherwise, the aromatic mono- or polycyclic hydrocarbon moiety typically comprises from 4 to 12 carbon atoms and optionally comprises one or more heteroatoms, preferably selected from nitrogen, oxygen and sulphur and combinations thereof and/or is optionally substituted with one or more lower alkyl groups, preferably $C_1$-$C_4$ straight or branched alkyl groups, and/or with one or more functional groups, preferably selected from one or more of hydroxy, alkoxy, carboxy, ester, amido and combinations thereof.

A monoamine to be used in process (P) can be represented with formula (III-A):

$$HN(R^1)_2 \qquad (III\text{-}A)$$

wherein $R^1$, equal to or different from one another, is hydrogen or an alkyl chain or an aromatic mono- or polycyclic hydrocarbon moiety as defined above, with the proviso that at least one $R^1$ is other than hydrogen. In aromatic monoamines, at least one $R^1$ is an aromatic mono- or polycyclic hydrocarbon moiety as defined above wherein at least one $sp^2$ carbon is bound to the nitrogen atom.

A polyamine to be used in process (P) can be represented with formula (III-B):

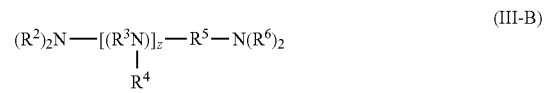

wherein:
$R^2$, $R^4$ and $R^6$, equal to or different from one another, are independently selected from hydrogen, alkyl chains and mono- or polycyclic hydrocarbon moieties as defined above, with the proviso that at least one of $R^2$, $R^4$ and $R^6$ is hydrogen;
$R^3$ and $R^5$, equal to or different from one another, are independently selected from straight or branched alkylene chains and aromatic mono- or polycyclic hydrocarbon moieties as defined above;
and z is 0 or an integer equal to or higher than 1.

In aromatic polyamines (III-B), at least one of $R^2$-$R^6$ is an aromatic mono- or polycyclic hydrocarbon moiety.

Preferably, z is 0 or an integer ranging from 1 to 3; more preferably, n is 0 or 1.

Preferred polyamines (III-B) are those wherein at least one of $R^2$ and at least one of $R^6$ are hydrogen and $R^4$ is also hydrogen. Even more preferred polyamines (III-B) are those wherein all of $R^2$, $R^4$ and $R^6$ are hydrogen.

Preferably, the polyamine to be used in process (P) is a symmetric polyamine, i.e. a polyamine wherein both $R^2$ are the same as groups $R^6$ and $R^3$ is the same as $R^5$.

A particularly preferred group of polyamine (III-B) is represented by those wherein all of $R^2$, $R^4$ and $R^6$ are hydrogen and $R^3$ and $R^5$ are alkylene chains as defined above; preferably, alkylene chain $R^3$ is the same as alkylene chain $R^5$.

Non limiting examples of amines (III-A) and (III-B) that can be used in process (P) include methylamine, ethylamine, propylamine, butylamine, dimethylamine, diethylamine, dibutylamine, N-methyl,N-ethylamine, ethylenediamine, propylene diamine, N-methyl-1,3-propanediamine, butylenediamine, hexamethylenediamine, cyclohexylamine, o-, m-, p-toluidine, aniline, N-methyl-aniline, 2,4,6-trimethylaniline and o-, m-, p-anisidine.

Although process (P) is particularly advantageous for the manufacture of primary, secondary and tertiary PFPE amines, as it allows achieving yields and selectivity higher than those achievable with known methods, it can be conveniently used also for the manufacture of PFPE quaternary ammonium salts, by reacting a PFPE sulfonic ester with tertiary monoamines, e.g. trimethylamine, triethylamine and the like or with polyamines comprising only tertiary amine groups. Thus, a further aspect of the present invention is a process (P') which comprises reacting a PFPE sulfonic ester (I) as defined above with an excess of an organic tertiary monoamine or with an excess of a polyamine comprising only tertiary amine groups at a temperature ranging from 20° C. to 50° C.

In process (P), a PFPE sulfonic ester, preferably a PFPE sulfonic ester complying with formula (I) as defined above, is reacted with an excess of ammonia or of organic amine as defined above.

If ammonia or an organic monoamine is used in process (P), at least 2, preferably 15, more preferably 50 equivalents of ammonia or organic monoamine are reacted with one equivalent of PFPE sulfonic ester.

If an organic polyamine is used, the excess with respect to the PFPE sulfonic ester complies with the following equation:

$$Ex=[(E_qAm)/(E_q\text{PFPE sulfonic ester})] \times 1/F_{Am}$$

wherein:
Ex=excess of organic polyamine amine;
$E_qAm$=equivalents of organic polyamine;
$E_q$PFPE sulfonic ester=equivalents of sulfonic ester;
$F_{Am}$=functionality of the organic polyamine
and wherein $(E_qAm)/(E_q\text{PFPE sulfonic ester})$ is of at least $2 \times F_{Am}$.

Preferably, $(E_qAm)/(E_q\text{PFPE sulfonic ester})$ is of at least $15 \times F_{Am}$; more preferably, $(E_qAm)/(E_q\text{PFPE sulfonic ester})$ is of at least $50 \times F_{Am}$. It has indeed been observed that, while high selectivity is always achieved as long as 2 equivalents of ammonia or organic monoamine per equivalent of PFPE sulfonic ester are used or as long as the $(E_qAm)/(E_q\text{PFPE sulfonic ester})$ ratio is $2 \times F_{Am}$, higher conversion of the PFPE sulfonic ester is achieved when said ratio is of at least $50 \times F_{Am}$.

The reaction between the PFPE sulfonic ester and ammonia or organic amine is carried out at a temperature ranging from 20° C. to 50° C. and can be carried out either under pressure or at ambient pressure. The temperature range of from 20° C. to 50° C. is measured under the selected pressure conditions, which will be established by the person skilled in the art according to the selected reagents.

The reaction can be carried out with or without solvents, although the use of solvents is preferred for facilitating the work up of the reaction and the isolation of the resulting PFPE amine. Suitable solvents that can be used according to the invention are aprotic organic solvents, for example acetonitrile, dimethylformamide, dimethylacetamide, dimethylsulfoxide, hexafluoroxylene and mixtures thereof. Preferred solvents are acetonitrile and hexafluoroxylene and mixtures thereof. Solvents or solvent mixtures can be used in an amount of from 2 to 4 volumes with respect to the PFPE sulfonic ester.

In addition to solvents or solvent mixtures and in addition to ammonia or to the selected organic amine, triethylamine (TEA) can also be used, preferably in an amount ranging from 0.8 to 2.0 by moles with respect to the meq of PFPE sulfonic ester, but in any case at an equivalent ratio with respect to ammonia or organic amine lower than 0.1, preferably lower than 0.05.

Reaction times typically range from 5 to 35 hrs, more preferably from 15 to 35 hrs. It has indeed been observed that reactions times higher than 15 hrs allow 100% conversion of the PFPE sulfonic ester.

At the end of the reaction, the reaction product is isolated from the reaction mixture according to known methods, which will be chosen by a person skilled in the art according to the physical state of said product.

Not only does process (P) according to the present invention occurs with high conversion of the PFPE sulfonic ester, but it also occurs with higher selectivity than that achievable with known methods, in particular with the method disclosed in the aforementioned U.S. Pat. No. 3,810,874. Selectivity is the amount of PFPE amine (expressed as percentage) resulting only from the nucleophilic attack of 1 mol of ammonia or of 1 mole of organic amine per mole of sulfonic ester group as defined above, with respect to the overall amount of PFPE amines obtained at the end of the reaction, which include also amines resulting from the nucleophilic attack of the former PFPE amine on the PFPE sulfonic ester. It has been observed that process (P) allows obtaining a selectivity of at least 95%.

In one embodiment, the PFPE amines that can be obtained according to process (P) are those deriving from the reaction of a PFPE sulfonic ester (I) as defined above with ammonia or with an organic monoamine (III-A) and comply with formula (IV-A):

G—O—$R_f$—L (IV-A)

wherein:
G is a group of formula (G-1):

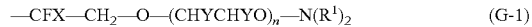
—CFX—CH$_2$—O—(CHYCHYO)$_n$—N(R$^1$)$_2$ (G-1)

in which X is F or CF$_3$; Y is, independently of each other, hydrogen or lower alkyl, typically C$_1$-C$_4$ alkyl, preferably methyl; n is 0 or a positive number equal to or higher than 1;

R$^1$ is independently hydrogen or an alkyl chain or an aromatic mono- or polycyclic hydrocarbon moiety as defined above;

R$_f$ is a PFPE chain as defined above;

L is the same as G or is a (per)haloalkyl group, typically a C$_1$-C$_3$ haloalkyl group, preferably selected from —CF$_3$, —CF$_2$Cl, —CF$_2$CF$_2$Cl, —C$_3$F$_6$Cl, —CF$_2$Br, —CF$_2$CF$_3$ and —CF$_2$H, —CF$_2$CF$_2$H.

In another embodiment, PFPE amines that can be obtained according to process (P) are those deriving from the reaction of a PFPE sulfonic ester (I) with a polyamine (III-B) and comply with formula (IV-B):

G'—O—$R_f$—H' (IV-B)

wherein G' is a group of formula (G'-1)

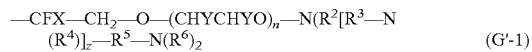
—CFX—CH$_2$—O—(CHYCHYO)$_n$—N(R$^2$[R$^3$—N (R$^4$)]$_z$—R$^5$—N(R$^6$)$_2$ (G'-1)

wherein X, Y, R$^3$, R$^5$ and n are as defined above and R$^2$, R$^4$ and R$^6$ are independently selected from hydrogen, alkyl chains and mono- or polycyclic hydrocarbon moieties as defined above.

Preferably, R$^2$ and R$^4$ are hydrogen and one of R$^6$ is also hydrogen. More preferably, all of R$^2$, R$^4$ and R$^6$ are hydrogen and R$^3$ and R$^5$ are alkylene chains as defined above; more preferably, alkylene chain R$^3$ is the same as alkylene chain R$^5$.

PFPE amines (IV-A) and (IV-B) wherein n in groups (G-1) and (G-1') is a positive number, preferably ranging from 1 to 10, and both Y groups are hydrogen, or one is hydrogen and the other one is methyl, represent a further aspect of the present invention.

For the sake of clarity, preferred PFPE amines (IV-A) and (IV-B) comply with formulae (IV-A$^1$) and (IV-B$^1$) here below:

G*—O—$R_f$—L* formula (IV-A$^1$):

wherein:
G* is a group of formula (G*-1):

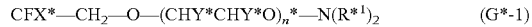
CFX*—CH$_2$—O—(CHY*CHY*O)$_n$*—N(R*$^1$)$_2$ (G*-1)

in which: X* is F or CF$_3$; Y* are both hydrogen or one is hydrogen and the other one is methyl; n* is a positive number, preferably ranging from 1 to 10; and R*$^1$ is hydrogen or a straight or branched alkyl chain as defined above or an aromatic mono- or polycyclic hydrocarbon moiety as defined above;

R$_f$ is a (per)fluoropolyether chain as defined above;

L* is the same as G*-1 or is a (per)haloalkyl group, typically a $C_1$-$C_3$ haloalkyl group, preferably selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$;

$$G'^*—O—R_f—L'^* \quad \text{formula (IV-B}^1\text{)}$$

wherein:

G'* is a group of formula (G'*-1)

$$—CFX^*—CH_2—O—(CHY^*CHY^*O)_{n^*}—N(R^{2^*})—\\ [R^{3^*}—N(R^{4^*})]_{z^*}-R^{5^*}—N(R^{6^*})_2 \quad \text{(G'*-1)}$$

in which X*, Y*, n* are the same as in formula (IV-$A^1$); $R^{2^*}$, $R^{4^*}$ and $R^{6^*}$, equal to or different from one another, are independently selected from hydrogen, alkyl chains and mono- or polycyclic hydrocarbon moieties as defined above; $R^{3^*}$ and $R^{5^*}$, equal to or different from one another, are straight or branched alkylene chains or aromatic mono- or polycyclic hydrocarbon moieties as defined above and and z* is 0 or an integer equal to or higher than 1;

$R_f$ is a (per)fluoropolyether chain as defined above;

L'* is the same as G'*-1 or is a (per)haloalkyl group, typically a $C_1$-$C_3$ haloalkyl group, preferably selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$.

According to one preferred embodiment, in groups (G*-1) and (G'*-1), the alkyl and alkylene chains do not comprise heteroatoms or functional groups other than nitrogen and the mono- or polycyclic hydrocarbon moieties are not substituted with one or more functional groups.

Preferred PFPE amines of formula (IV-$B^1$) are those wherein $R^{2^*}$, $R^{4^*}$ are hydrogen and one of $R^{6^*}$ is hydrogen. More preferred are PFPE amines of formula (IV-$B^1$) wherein all of $R^{2^*}$, $R^{4^*}$ and $R^{6^*}$ are hydrogen and $R^{3^*}$ and $R^{5^*}$ are alkylene chains as defined above. Preferably alkylene chain $R^{3^*}$ is the same as alkylene chain $R^{5^*}$.

As explained above and as it will also be apparent from the Examples reported in the following Experimental section, process (P) allows the obtaining of primary, secondary and tertiary mono- and bi-functional PFPE amines with high yields and selectivity and under mild conditions that can be conveniently applied on an industrial scale.

The PFPE amines obtainable according to process (P) can be used as such or as starting materials for other functional polymers or as building blocks for copolymers. In particular, PFPE amines of formula (IV-$B^1$) can be conveniently used for the manufacture of hyperbranched polymers or as cross-linkers in the manufacture of polymer networks. The PFPE amines can also be converted into ammonium salts according to methods known in the art by reaction with organic or inorganic acids.

Should the disclosure of any patents, patent applications, and publications which are incorporated herein by reference conflict with the description of the present application to the extent that it may render a term unclear, the present description shall take precedence.

The invention will be herein after illustrated in greater detail in the following Experimental section by means of non-limiting Examples.

Experimental Section

Materials and Methods

PFPE sulfonic esters having formulae:

$$R_F(OSO_2C_4F_9)_2$$

wherein $R_F$=—$CH_2CF_2O(CF_2CF_2O)_a$ $(CF_2O)_{a2}OCF_2CH_2$— with a1/a2=1.3 ($M_n$=2,254 g/mol, $E_w$=1,241 g/eq, functionality F=1.82) and $$R_F[(OCH_2CH_2)_{1.7}OSO_2Ph\text{-}CH_3]_2$$

wherein $R_F$ is as defined above ($M_n$=2,000 g/mol $E_w$=1,081 g/eq F=1.84) were prepared as described in Preparation Examples 1 and 2 respectively from PFPE alcohols of formula:

$$HOCH_2CF_2O(CF_2CF_2O)_{a1}(CF_2O)_{a2}OCF_2CH_2OH,$$

wherein a1/a2=1.3 ($M_n$=1,690, $E_w$=929, F=1.82), available form Solvay Specialty Polymers Italy, S.p.A. under tradename Fomblin®,
and of formula:

$$H(OCH_2CH_2)_nOCH_2CF_2O(CF_2CF_2O)_{a1}(CF_2O)_{a2}\\ OCF_2CH_2O(CH_2CH_2O)_nH,$$

wherein: n=1.7; a1/a2=1.3 ($M_n$=1,745, $E_w$=946, F=1.85), available form Solvay Specialty Polymers Italy, S.p.A. under tradename Fluorolink®.

The rest of the solvents and reagents are commercially available and were used as received.

$^1$H-NMR analyses were performed on a Varian Mercury 300 Mhz spectrometer employing tetramethylsilane (TMS) as an internal standard.

$^{19}$F-NMR analyses were performed on a Varian Mercury 300 Mhz spectrometer employing $CFCl_3$ as an internal standard.

Preparation Example 1 Synthesis of a PFPE Sulfonic Ester of Formula $R_F(OSO_2C_4F_9)_2$ The sulfonic acid ester of formula $R_F(OSO_2C_4F_9)_2$ (herein after also "PFPE nonaflate") was prepared as follows:

A glass reactor was charged with triethylamine (TEA) (4.95 g, 49 meq), and perfluoro-1-butanesulfonyl fluoride (12.3 g, 40.8 meq) under mechanical stirring. The internal temperature of the reaction mass was lowered to −5+5° C. using a dry ice bath. Fomblin® Z DOL PFPE (20 g, 12 meq) of formula:

$$HOCH_2CF_2O(CF_2CF_2O)_{a1}(CF_2O)_{a2}CF_2CH_2OH$$

(where a1 and a2 as defined above and are selected in such a way as the Mw and Ear are 1690 and 929, respectively; a1/a2=1.3)
was added drop-wise under vigorous stirring. Thereafter, the reaction mass was warmed up to room temperature, under mechanical stirring. The reaction was monitored by $^{19}$F-NMR. After 1 hour at room temperature a sample was taken for NMR analysis and the observed conversion of the hydroxy groups into perfluorobutanesulfonate groups was 70%. The internal temperature was increased up to 60° C. until completion of the reaction. After complete conversion, the reaction mass was cooled to room temperature and the product was washed twice with ethanol (20 g each time). The organic phase was separated and ethanol was stripped at 70° C. under vacuum. The resulting product PFPE sulfonic ester was isolated with a purity>96% and a yield>90%. Typical diagnostic $^{19}$F-NMR signals of this product resonate at −107.5 ppm while the diagnostic peak of any perfluorosulfonate (hydrolysed nonaflate) resonates at −111.5 ppm. The resulting PFPE sulfonic ester had a MW of 2,254 and an EW of 1,241.

Preparation Example 2—Synthesis of a PFPE Sulfonic Ester of Formula $R_F[(OCH_2CH_2)_{1.7}OSO_2PhCH_3]_2$ A 3-necked glass reactor was first inertized with anhydrous $N_2$ at 50° C. Thereafter, 25 g (14.3 mmoles, 26.4 meq) PFPE-alcohol of formula:

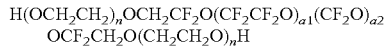
$OCF_2CH_2O(CH_2CH_2O)_nH$ wherein: n=1.7; a1/a2=1.3; $M_n$=1745, $E_w$=946, andyrous TEA (3.1 g, 30.4 mmoles) and 10 ml dichloromethane (DCM) were placed in the glass reactor which was kept under static $N_2$ atmosphere. The mixture was heated to 45° C. with vigorous stirring (950 rpm). Once this temperature was reached, a mixture of tosyl chloride (Ts-Cl; 5.8 g, 30.4 mmoles) and 15 ml DCM was added drop-wise in 15 min. The reaction mixture was stirred at 45° C. for 8 hrs; the mixture turned milky-white due to the formation of triethyl ammonium chloride. The reaction mixture was cooled to room temperature and the formation of two phases was observed. The clear lower phase was collected and diluted in 30 ml HFX; a top layer separated which mainly contained the excess of unreacted Ts-Cl. The lower layer was distilled in order to remove volatile species under reduced pressure (0.9 mbar=$9 \times 10^4$ mPa) at 65° C., thereby obtaining a clear, colorless oil identified as the desired sulfonic ester ($M_n$=2,000, $E_w$=1,081).

Examples 1-7—Synthesis of a PFPE Diamine of Formula $R_F(NH_2)_2$

Example 1

The PFPE sulfonic ester of Preparative example 1 (5.00 g, 4.04 meq) anhydrous triethylamine (TEA; 0.71 g, 7.01 mmol) anhydrous acetonitrile (8 ml) and hexafluoroxylene (HFX, 7 ml) were loaded in a stainless steel autoclave equipped with a magnetic stirrer, entrance and exit valves, a digital transducer connected to a digital pressure reader, a heating mantle, thermocouple connected to a potentiometer and a temperature reader. The autoclave was cooled to −78° C. and vacuum was applied to reduce the autoclave internal pressure to 0.1 residual absolute mbars ($10^4$ mPa). A commercially available stainless steel cylinder containing gaseous $NH_3$ was placed on an analytical balance and connected to the autoclave, then $NH_3$ was bubbled in (3.72 g; 218.8 mmol; 50 equivalents $NH_3$ per equivalent of PFPE sulfonic ester). The $NH_3$ cylinder was then disconnected from the autoclave and the autoclave was allowed to warm up up to room temperature and then kept at 30° C. with vigorous stirring (1000 rpms) for 15 hrs. The autoclave internal pressure rose to 5-6 absolute bars (5 $6 \times 10^5$ mPa). After this time the autoclave was allowed to cool to 20° C. and the excess $NH_3$ was slowly bled from the autoclave. The autoclave was then opened and the content was poured in a separatory funnel. The resulting PFPE diamine separated as a colourless, clear oily bottom layer and was separated from the top one. The fraction of the PFPE diamine which partitioned in the top layer was recovered by adding 5 ml of HFX to the top layer and by washing twice with 10 ml distilled $H_2O$. The bottom organic layer was dried over $MgSO_4$, filtered and HFX was distilled away. The resulting oil, consisting of the PFPE diamine, was pooled with the previously separated bottom layer.

Selectivity towards $R_F(NH_2)_2$=98 mol %.
Conversion of the PFPE nonaflate=100 mol %.
Selectivity with respect to a dimer of formula: $R_F$—$(NH$—$R_F$—$NH_2)_2$=2 mol %.
Hydrolysis of the PFPE nonaflate to the corresponding PFPE alcohol with —$OCF_2CH_2OH$ end groups=0 mol %.
$^{19}$F-NMR(CFCl$_3$; δ=ppm vs. CFCl$_3$): −52, −53.5, −55.3 (—O$\underline{CF}_2$O—); −79.6, 82.7 (—O$\underline{CF}_2$CH$_2$NH$_2$); −78.6 (—O$\underline{CF}_2$CH$_2$NHCH$_2$$\underline{CF}_2$—); −88.9, −90.6 (—O$\underline{CF}_2$$\underline{CF}_2$O—).
$^1$H-NMR (TMS; δ=ppm vs. TMS): 2.45 (—OCF$_2$$\underline{CH}_2$NH$_2$); 0.79 (—OCF$_2$CH$_2$$\underline{NH}_2$).

Example 2

Example 1 was repeated with the difference that $CH_3CN$ was omitted.
Selectivity towards $R_F(NH_2)_2$=96 mol %.
PFPE nonaflate conversion=100 mol %.
Selectivity with respect to a dimer of formula $R_F$—$(NH$—$R_F$—$NH_2)_2$=5 mol %.
Hydrolysis of the PFPE nonaflate to the corresponding PFPE alcohol with —$OCF_2CH_2OH$ end groups=0 mol %.

Example 3

Example 2 was repeated with the difference that $CH_3CN$ was omitted and the reaction time was shortened to 6 hours.
Selectivity towards $R_F(NH_2)_2$=95 mol %.
PFPE nonaflate conversion=79.7 mol %.
Selectivity with respect to a dimer of formula $R_F$—$(NH$—$R_F$—$NH_2)_2$=6 mol %.
Hydrolysis of the PFPE nonaflate to the corresponding PFPE alcohol with —$OCF_2CH_2OH$ end groups=0 mol %.

Example 4

Example 1 was repeated with the difference that $Et_3N$ was omitted.
Selectivity towards $R_F(NH_2)_2$=96 mol %.
PFPE nonaflate conversion=100 mol %.
Selectivity with respect to a dimer of formula $R_F$—$(NH$—$R_F$—$NH_2)_2$=4 mol %.
Hydrolysis of the PFPE nonaflate to the corresponding PFPE alcohol with —$OCF_2CH_2OH$ end groups=0 mol %.

Example 5

Example 1 was repeated with the difference that $CH_3CN$, HFX and $Et_3N$ were omitted.
Selectivity towards $R_F(NH_2)_2$=96 mol %.
PFPE nonaflate conversion=100 mol %.
Selectivity with respect to a dimer of formula $R_F$—$(NH$—$R_F$—$NH_2)_2$=6 mol %.
Hydrolysis of the PFPE nonaflate to the corresponding PFPE alcohol with —$OCF_2CH_2OH$ end groups=0 mol %.

Example 6

Example 1 was repeated employing 16 equivalents of $NH_3$ per equivalent of PFPE nonaflate.
Selectivity towards $R_F(NH_2)_2$=97 mol %.
PFPE nonaflate conversion=91.8 mol %.
Selectivity with respect to a dimer of formula $R_F$—$(NH$—$R_F$—$NH_2)_2$=5.8 mol %.
Selectivity with respect to a trimer of formula $R_F$—$(NH$—$R_F$—$NH$—$R_F$—$NH_2)_2$=0.2 mol %.
Hydrolysis of the PFPE nonaflate to the corresponding PFPE alcohol with —$OCF_2CH_2OH$ end groups=0 mol %.

Example 7

Example 1 was repeated employing 16 equivalents of $NH_3$ per equivalent of PFPE nonaflate and lengthening the reaction time to 35 hrs.
Selectivity towards $R_F(NH_2)_2$=95 mol %.
PFPE nonaflate conversion=100 mol %.
Selectivity with respect to a dimer of formula: $R_F$—$(NH$—$R_F$—$NH_2)_2$=5.0 mol %.
Hydrolysis of the PFPE nonaflate to the corresponding PFPE alcohol with —$OCF_2CH_2OH$ end groups=0 mol %.

Example 8

Example 1 was repeated at a temperature of 50° C.
Selectivity towards $R_F(NH_2)_2$=95 mol %.
PFPE nonaflate conversion=100 mol %.
Selectivity towards dimer $R_F$—$(NH$—$R_F$—$NH_2)_2$=5.3 mol %.
Hydrolysis of PFPE nonaflate to the corresponding PFPE alcohol with —$OCF_2CH_2OH$ end groups=0 mol %.

Comparative Example 1—Synthesis of the Diamine of Examples 1-7 Following the Teaching of U.S. Pat. No. 3,810,874

Example 1 was repeated with the difference that $NH_3$ was used in 16 equivalents of $NH_3$ per equivalent of PFPE nonaflate, no solvent, co-solvent ($CH_3CN$ and HFX) and co-reagent ($Et_3N$) were used and that the reaction temperature was 100° C.
Selectivity towards $R_F(NH_2)_2$=66.7 mol %.
PFPE nonaflate conversion=98 mol %.
Selectivity towards a dimer of formula $R_F$—$(NH$—$R_F$—$NH_2)_2$=25.3 mol %.
Selectivity towards a trimer of formula $R_F$—$(NH$—$R_F$—$NH$—$R_F$—$NH_2)_2$=8 mol %.
Hydrolysis of the PFPE nonaflate to the corresponding PFPE alcohol with —$OCF_2CH_2OH$=5.3 mol %.

Example 9—Synthesis of a PFPE Amine of Formula $R_F$—$(NC_6H_{11})_2$

Example 1 was repeated with the difference that cyclohexylamine was used in place of $NH_3$ and operating at atmospheric pressure in a glass reactor at 45° C.
Selectivity towards $R_F$—$(NC_6H_{11})_2$=99.1 mol %.
PFPE nonaflate conversion=100 mol %.
Selectivity towards a dimer of formula $R_F[C_6H_{11})N$—$R_F$—$NHC_6H_{11}]_2$=0 mol %.
Hydrolysis of PFPE nonaflate to the corresponding PFPE alcohol with —$OCF_2CH_2OH$ end groups=0.9 mol %.

Example 10—Synthesis of a PFPE Amine of Formula: $R_F$—$[N(CH_2CH_3)_2]_2$

Example 1 was repeated with the difference that diethylamine was used instead of $NH_3$ and operating at atmospheric pressure in a glass reactor at 50° C.
Selectivity towards $R_F$—$[N(CH_2CH_3)_2]_2$=98.5 mol %.
PFPE nonaflate conversion=100 mol %.
Selectivity towards a dimer of formula $R_F$—$[N^+(C_2F_{15})_2$—$R_F$—$N(C_2F_{15})_2]_2$ $(C_4F_9SO_3^-)_2$=0 mol %.
Hydrolysis of the PFPE nonaflate to the corresponding PFPE alcohol with —$OCF_2CH_2OH$ end groups=1.5 mol %.

Example 11—Synthesis of a PFPE Amine of Formula $R_F$—$(NHCH_2CH_2NH_2)_2$

Example 1 was repeated with the difference that ethylene diamine was used in place of $NH_3$ with an $E_qAm/E_q$PFPE sulfonic ester ratio=100 and operating at atmospheric pressure in a glass reactor.
Selectivity towards $R_F$—$(NHCH_2CH_2NH_2)_2$=96 mol %.
PFPE nonaflate conversion=100 mol %.
Selectivity towards a dimer of formula $R_F$—$(NHCH_2CH_2NH$—$R_F$—$NHCH_2CH_2NH_2)_2$=2 mol %.
Hydrolysis of the PFPE nonaflate to the corresponding PFPE alcohol with —$OCF_2CH_2OH$ end groups=2 mol %.

Example 12—Synthesis of a PFPE Amine of Formula $R_F$—$[NH(CH_2)_6NH_2]_2$

Example 2 was followed with the difference that hexamethylene diamine was used in place of $NH_3$ with an $E_qAm/E_q$PFPE sulfonic ester ratio=100 and operating at atmospheric pressure in a glass reactor.
Selectivity towards $R_F$—$[NH(CH_2)_6NH_2]_2$=95 mol %.
PFPE nonaflate conversion=100 mol %.
Selectivity towards a dimer of formula: $R_F$—$[NH(CH_2)_6NH$—$R_F$—$NH(CH_2)_6NH_2)_2$<5 mol %.
Hydrolysis of the PFPE nonaflate to the corresponding PFPE alcohol with —$OCF_2CH_2OH$ end groups=2 mol %.

Example 13—Reaction of the PFPE Sulfonic Ester of Preparation Example 1 with N-Methyl-1,3-Propanediamine Example 2 was repeated with the difference that N-methyl-1,3-propanediamine was used instead of $NH_3$ with an $E_qAm/E_q$ PFPE sulfonic ester ratio=100 and operating at atmospheric pressure in a glass reactor.
Selectivity towards $R_F[NH(CH_2)_3NH(CH_3)]_2$+$R_F[N(CH_3)(CH_2)_3NH_2]_2$=95 mol %
$R_F[NH(CH_2)_3NH(CH_3)]_2$ 70% mol
$R_F[N(CH_3)(CH_2)_3NH_2]_2$ 30% mol
PFPE nonaflate conversion=100 mol %.
Selectivity towards dimerization products<4%
Hydrolysis of the PFPE nonaflate to a PFPE alcohol with —$OCF_2CH_2OH$ —$OCF_2CH_2OH$ end groups=2 mol %.

Example 14—Synthesis of a PFPE amine of formula $R_F$—$[(OCH_2CH_2)_nNH_2]_2$ The PFPE sulfonic ester obtained as described in Preparation Example 2 (16 g, 9 mmoles, 16.61 meq), $CH_3CN$ (40 ml) and HFX (32 ml) were charged at room temperature in a stainless steel autoclave. The autoclave was sealed and cooled to −78° C. in a dry-ice/acetone slurry. The reaction mixture inside the autoclave was inertized by performing 4 $N_2$/vacuum cycles. Under vacuum and at −78° C. gaseous $NH_3$ (14.1 g, 830.5 mmoles) was condensed in the autoclave. The autoclave was then heated at 45° C. under magnetic stirring (1,100 rpm) for 10 hrs. The autoclave was then cooled to room temperature and its content was poured in separatory funnel. Ammonium tosylate that formed as by-product appeared as an insoluble crystalline solid which is separated from the organic mixture by filtration using a 5 micron PTFE filtering membrane. The resulting organic phase is washed twice with distilled $H_2O$ to remove any remaining $NH_3$, traces of ammonium tosylate as well as most of the $CH_3CN$. The organic phase was then dried over $MgSO_4$, filtered over a 5 micron PTFE membrane and distilled at 65° C. under reduced pressure (0.9 mbar=9×10$^4$ mPa). A clear oil was obtained and identified as the desired $R_F$—[$(OCH_2CH_2O)_n NH_2$]$_2$ amine.

Selectivity towards $R_F$—[$O(CH_2CH_2O)_n NH_2$]$_2$=97%.
PFPE sulfonate conversion: 100%.
Selectivity towards a dimer of formula: $R_F$—[$(OCH_2CH_2)_n NH$—$(CH_2CH_2O)_n R_F$—$(OCH_2CH_2)_n NH_2$]$_2$: 1%.

Example 15—Synthesis of a PFPE Ammonium Salt of Formula $R_F$—[$N+(Et)_3$]$_2$($C_4F_9SO_3^-$)$_2$ Example 1 was repeated with the difference that triethylamine was used in place of $NH_3$ and operating at atmospheric pressure in a glass reactor at 50° C.

Selectivity towards $R_F$—[$N^+(Et)_3$]$_2$($C_4F_9SO_3^-$)$_2$=95 mol %.
PFPE nonaflate conversion=100 mol %.
Hydrolysis of the PFPE nonaflate to the corresponding PFPE alcohol with —$OCF_2CH_2OH$ end groups=4 mol %.

The invention claimed is:

1. A process for the manufacture of a (per)fluoropolyether amine, said process comprising reacting a sulfonic ester of a (per)fluoropolyether alcohol with an excess of ammonia or of organic amine at a temperature ranging from 20° C. to 50° C. and in the presence of an aprotic organic solvent selected from acetonitrile, dimethylformamide, dimethylacetamide, dimethylsulfoxide, hexafluoroxylene and mixtures thereof, wherein the sulfonic ester of a (per)fluoropolyether alcohol complies with formula (I)

$$A\text{-}O\text{—}R_f\text{—}B \quad (I)$$

wherein:
A is a group of formula —CFX—$CH_2$—O—(CHY-CHYO)$_n$—$SO_2$—R wherein: X is F or $CF_3$; R is perfluoroalkyl, each Y is, independently of each other, hydrogen or lower alkyl and n is 0 or a positive number;
$R_f$ is a fully or partially fluorinated polyether chain;
B is the same as A or is a (per)haloalkyl group.

2. The process according to claim 1, wherein the sulfonic ester of the (per)fluoropolyether alcohol is a sulfonic ester of a polymer comprising a fully or partially fluorinated polyether chain ($R_f$) having at least two chain ends, wherein at least one chain end bears at least one hydroxy group and wherein at least one chain end bears at least one sulfonic ester group.

3. The process according to claim 2, wherein the sulfonic ester of the (per)fluoropolyether alcohol is a sulfonic ester of a polymer comprising a fully or partially fluorinated polyether chain ($R_f$) having two chain ends, wherein at least one chain end bears at least one hydroxy group.

4. The process according to claim 1, wherein chain ($R_f$) comprises recurring units)($R^o$) selected from:
(i) —CFXO—, wherein X is F or $CF_3$,
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, is F, Cl, or H;
(iv) —$CF_2CF_2CF_2CF_2O$—; and
(v) —$(CF_2)_j$—CFZ—O— wherein j is an integer from 0 to 3 and Z is a group of general formula —$OR_f^*T$, wherein $R_f^*$ is a fluoropolyoxyalkene chain comprising a number of repeating units from 0 to 10, said recurring units each independently being chosen from: —CFXO—, —$CF_2CFXO$—, —$CF_2CF_2CF_2O$—, and —$CF_2CF_2CF_2CF_2O$—, with each of each of X being independently F or $CF_3$ and T being a $C_1$-$C_3$ perfluoroalkyl group.

5. The process according to claim 4, wherein chain ($R_f$) complies with formula ($R_f$-I):

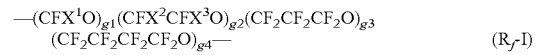  (R$_f$-I)

wherein:
each $X^1$ is independently selected from —F and —$CF_3$;
each $X^2$ and $X^3$, equal or different from each other and at each occurrence, are independently —F, —$CF_3$, with the proviso that at least one of X is —F;
g1, g2, g3, and g4, equal or different from each other, are independently integers≥0, such that g1+g2+g3+g4 is in the range from 2 to 300; should at least two of g1, g2, g3 and g4 be different from zero, the different recurring units are statistically distributed along the chain.

6. The process according to claim 5, wherein g1+g2+g3+g4 is in the range from 2 to 100.

7. The process of claim 5, wherein chain ($R_f$) is selected from chains of formulae ($R_f$-IIA)-($R_f$-IIE):

  (R$_f$-IIA)

wherein:
a1 and a2 are independently integers≥0 such that the number average molecular weight is between 400 and 10,000;

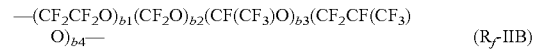  (R$_f$-IIB)

wherein:
b1, b2, b3, and b4 are each independently integers≥0 such that the number average molecular weight is between 400 and 10,000;

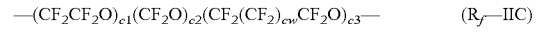  (R$_f$-IIC)

wherein:
cw is 1 or 2;
c1, c2, and c3 are independently integers≥0 such that the number average molecular weight is between 400 and 10,000;

  (R$_f$-IID)

wherein:
d is an integer>0 such that the number average molecular weight is between 400 and 10,000; and

  (R$_f$-IIE)

wherein:
  each Hal, equal or different at each occurrence, is a halogen selected from fluorine and chlorine atoms;
  e1, e2, and e3, equal to or different from each other, are independently integers≥0 such that the (e1+e2+e3) sum is comprised between 2 and 300.

8. The process of claim 7, wherein chain ($R_f$) complies with formula ($R_f$-III):

$$—(CF_2CF_2O)_{a1}(CF_2O)_{a2}— \qquad (R_f\text{-III})$$

wherein:
  a1 and a2 are integers>0 such that the number average molecular weight is between 400 and 4,000, with the ratio a2/a1 being comprised between 0.2 and 5.

9. The process according to claim 7, wherein:
  both a1 and a2 are different from zero, with the ratio a1/a2 being comprised between 0.1 and 10;
  b1 is 0 and b2, b3 and b4 are each >0, with the ratio b4/(b2+b3) being ≥1; and
  c1, c2 and c3 are all >0, with the ratio c3/(c1+c2) being less than 0.2.

10. The process of claim 1, wherein the organic amine complies with formula (III-A):

$$HN(R^1)_2 \qquad (III\text{-}A)$$

wherein R', equal to or different from one another, is:
  hydrogen or a $C_1$-$C_{20}$ straight or branched alkyl chain, said alkyl chain optionally comprising one or more mono- or polycyclic hydrocarbon moieties, heteroatoms other than nitrogen, or functional groups other than amine groups; or
  an aromatic mono- or polycyclic hydrocarbon moiety comprising from 4 to 12 carbon atoms, said mono- or polycyclic hydrocarbon moiety optionally comprising heteroatoms or functional groups;
  with the proviso that at least one $R^1$ is other than hydrogen and with the proviso that, if amine (III-A) is an aromatic monoamine, at least one $R^1$ is an aromatic mono- or polycyclic hydrocarbon moiety wherein at least one $sp^2$ carbon is bound to the nitrogen atom.

11. The process of claim 1, wherein the organic amine complies with formula (III-B):

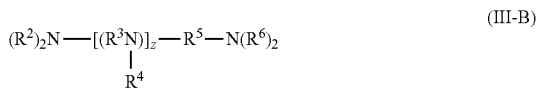
$$(R^2)_2N—[(R^3N)]_z—R^5—N(R^6)_2 \qquad (III\text{-}B)$$
$$\qquad\quad |$$
$$\qquad\quad R^4$$

wherein:
  $R^2$, $R^4$ and $R^6$, equal to or different from one another, are independently selected from: hydrogen; $C_1$-$C_{20}$ straight or branched alkyl chains, said alkyl chains optionally comprising one or more mono- or polycyclic hydrocarbon moieties, heteroatoms other than nitrogen, or functional groups other than amine groups; and aromatic mono- or polycyclic hydrocarbon moieties comprising from 4 to 12 carbon atoms, said mono- or polycyclic hydrocarbon moieties optionally comprising heteroatoms or functional groups, with the proviso that at least one of $R^2$, $R^4$ and $R^6$ is hydrogen;
  $R^3$ and $R^5$, equal to or different from one another, are independently selected from: straight or branched alkylene chains comprising from 1 to 20 carbon atoms, optionally comprising one or more mono- or polycyclic hydrocarbon moieties, heteroatoms other than nitrogen, or functional groups other than amine groups; and aromatic mono- or polycyclic hydrocarbon moieties comprising from 4 to 12 carbon atoms, said mono- or polycyclic hydrocarbon moieties, optionally comprising heteroatoms or functional groups; and
  z is 0 or an integer equal to or higher than 1.

12. The process according to claim 11, wherein z is 0 or an integer ranging from 1 to 3.

13. The process of claim 1, wherein:
  if ammonia or an organic monoamine is used, the excess of ammonia or organic amine is of at least 2 equivalents of ammonia or organic amine per equivalent of sulfonic ester of a (per)fluoropolyether alcohol;
  if an organic polyamine is used, the ratio:

$$(E_qAm)/(E_q\text{PFPE sulfonic ester})$$

wherein:
    $E_qAm$=equivalents of organic polyamine and
    $E_q$PFPE sulfonic ester=equivalents of sulfonic ester
    is of at least $2 \times F_{Am}$, wherein $F_{Am}$=functionality of the organic polyamine.

14. The process of claim 13, wherein $(E_qAm)/(E_q$PFPE sulfonic ester) is of at least $15 \times F_{Am}$.

15. The process of claim 14, wherein $(E_qAm)/(E_q$PFPE sulfonic ester) is of at least $50 \times F_{Am}$.

16. The process according to claim 1, wherein R is —$C_4F_9$.

* * * * *